(12) United States Patent
Zhang et al.

(10) Patent No.: US 8,266,336 B2
(45) Date of Patent: Sep. 11, 2012

(54) VIDEO DEVICE

(75) Inventors: Jin-Jie Zhang, Shenzhen (CN); Qiang Tao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/882,151

(22) Filed: Sep. 14, 2010

(65) Prior Publication Data

US 2012/0036285 A1 Feb. 9, 2012

(30) Foreign Application Priority Data

Aug. 4, 2010 (CN) ...................... 2010 2 0281495 U

(51) Int. Cl.
*G06F 3/00* (2006.01)
(52) U.S. Cl. ........................................................ 710/17
(58) Field of Classification Search ........................ None
See application file for complete search history.

(56) References Cited

U.S. PATENT DOCUMENTS 7,769,917 B1 * 8/2010 Lee .................................. 710/18
2007/0247447 A1 * 10/2007 Mack et al. .................... 345/204

* cited by examiner

*Primary Examiner* — Chun-Kuan Lee
*Assistant Examiner* — Ronald Modo
(74) *Attorney, Agent, or Firm* — Altis Law Group, Inc.

(57) ABSTRACT

A video device includes a signal generating circuit configured for generating video signals; an internal resistor connected to the output port of the signal generating circuit and matching with an external resistor of an external device; a detecting circuit connected to two ends of the internal resistor through two input ports thereof, and configured for detecting voltages of the two ends of the internal resistor and outputting a voltage difference therebetween; a controlling circuit connected to the output port of the detecting circuit, and configured for determining whether or not the external device is connected to the video device according to the voltage deference, and outputting a controlling signal to the signal generating circuit; an auxiliary detecting circuit connected to the output port of the controlling circuit, and configured for generating an auxiliary detecting signal transmitted to the internal resistor.

13 Claims, 1 Drawing Sheet

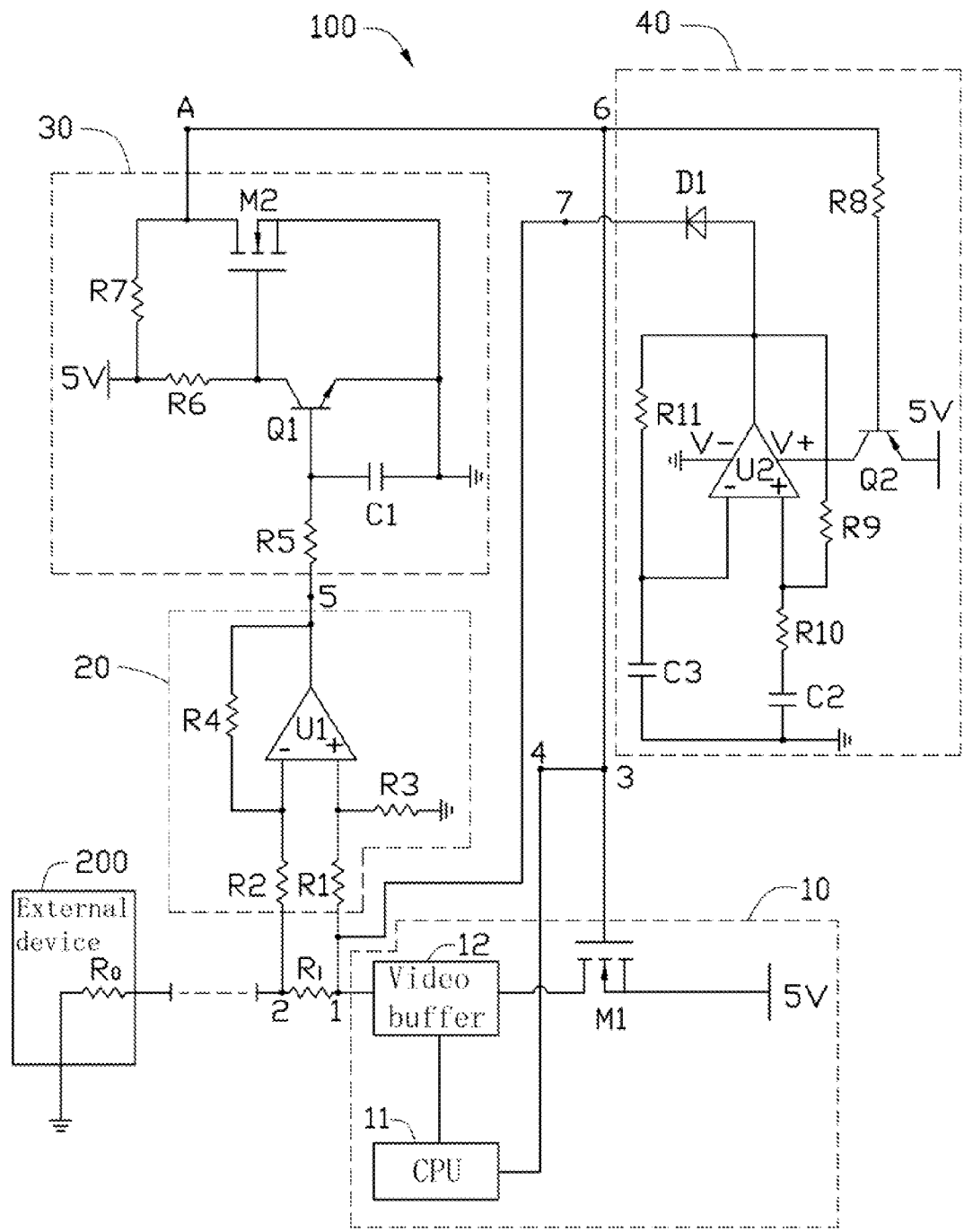

VIDEO DEVICE

BACKGROUND

1. Technical Field

The present disclosure generally relates to video devices and, particularly, to a video device that can automatically detect its status of connection to an external device.

2. Description of Related Art

Usually, a typical video device such as a digital video disc (DVD) player has a central processing unit (CPU) for processing video and audio data, a video buffer for buffering the video and audio data received from the CPU, and an output port for transmitting out the video and audio data. An external device such as a television can be detachably connected to the output port through a cable for receiving the video and audio data. The CPU and the video buffer generally maintain a working state once the typical video device is turned on. Thus, power efficiency is less than satisfactory.

Therefore, it is desirable to provide a video device which can overcome the limitations described.

BRIEF DESCRIPTION OF THE DRAWING

The drawing is a circuit diagram of a video device, according to an exemplary embodiment.

DETAILED DESCRIPTION

Referring to the drawing, a video device 100, according to an exemplary embodiment of the present disclosure, can automatically detect its connection status to an external device 200. The video device 100 comprises a signal generating circuit 10, an internal resistor a detecting circuit 20, a controlling circuit 30, and an auxiliary detecting circuit 40.

The signal generating circuit 10 is configured for generating a video signal. The internal resistor $R_i$ is connected to the output port of the signal generating circuit 10 and matches with an external resistor $R_o$ of the external device 200. The detecting circuit 20 is connected to the two ends of the internal resistor $R_i$ through two input ports, and configured for detecting voltages of the two ends of the internal resistor $R_i$ and outputting a voltage difference. The controlling circuit 30 is connected to the output port of the detecting circuit 20, and configured for determining whether or not the external device 200 is connected to the video device 100 based on the voltage difference, and sending a controlling signal to the signal generating circuit 10 and the auxiliary detecting circuit 40. The auxiliary detecting circuit 40 is connected to the output port of the controlling circuit 30, and configured for generating an auxiliary signal transmitted to the internal resistor $R_i$.

In the present embodiment, the video device 100 is a DVD player. Understandably, the video device 100 could be a video decoder or a computer. The resistance of the internal resistor $R_i$ is about 70-80 ohms and, particularly, is about 75 ohms. The external device 200 is a television or other display device. Corresponding to the resistance of the internal resistor the resistance of the external resistor $R_o$ is also about 70-80 ohms and, specifically, is about 75 ohms. The external device 200 can be connected to the video device 100 through a cable (not shown).

The signal generating circuit 10 has two input ports 3, 4 and an output port 1, and is comprised of a CPU 11, a video buffer 12, and a transistor M1. The input port of the CPU 11 is connected to the input port 4, and the output port of the CPU 11 is connected to the video buffer 12. The CPU 11 is configured for decoding video and audio data and transmitting the decoded video and audio data to the video buffer 12. The output port of the video buffer 12 is connected to the output port 1. The transistor M1 is a metal oxide semiconductor field effect transistor (MOSFET). The transistor M1 is positioned between a 5V power supply and the video buffer 12, and configured for controlling connection or disconnection between the 5V power supply and the video buffer 12. The drain of the transistor M1 is connected to the 5V power supply, the source is connected to the video buffer 12, and the gate is connected to the input port 3.

The internal resistor $R_i$ is comprised of an input port and an output port 2, wherein the input port is connected to the output port 1 of the signal generating circuit 10, and the output port 2 is directly connected to the external device 200 through a cable.

The detecting circuit 20 has two input ports and an output port 5. The detecting circuit 20 is comprised of a comparator U1, four resistors R1, R2, R3, and R4. The two ends of resistor R1 are respectively connected to the output port 1 of the signal generating circuit 10 and the positive terminal of the comparator U1. The two ends of resistor R2 are respectively connected to output port 2 of the internal resistor $R_i$ and the negative terminal of the comparator U1. The positive terminal of the comparator U1 is grounded through the resistor R3. The negative terminal of the comparator U1 is connected to its output port through the resistor R4. The output port of the comparator U1 is connected to the output port 5.

The controlling circuit 30 has an input port and an output port A. The controlling circuit 30 is comprised of a transistor Q1, a transistor M2, a capacitor C1, and three resistors R5, R6 and R7. The transistor M2 is a metal oxide semiconductor field effect transistor (MOSFET). The two ends of the resistor R5 is respectively connected to the output port 5 of the detecting circuit 20 and the base of the transistor Q1. The base of the transistor Q1 is grounded through the capacitor C1. The emitter of the transistor Q1 is directly grounded. The collector of the transistor Q1 is connected to the 5V power supply through the resistor R6 and connected to the gate of the transistor M2. The source of the transistor M2 is directly grounded, and the drain of the transistor M2 is connected to the 5V power supply through the resistor R7. The drain of the transistor M2 is the output port A. Controlling signals output from the controlling circuit 30 are transmitted to the gate of the transistor M1, the input port 4 of the signal generating circuit 10, and the auxiliary detecting circuit 40 simultaneously.

The auxiliary detecting circuit 40 has an input port 6 and an output port 7. The input port 6 is connected to the output port A of the controlling circuit 30. The auxiliary detecting circuit 40 includes a transistor Q2, a comparator U2, two capacitors C2 and C3, four resistors R8, R9, R10 and R11, and a diode D1. The two ends of the resistor R8 are respectively connected to the input port 6 and the base of the transistor Q2. The emitter of the transistor Q2 is connected to the 5V power supply and the collector is connected to the positive terminal of the comparator U2. The negative terminal of the comparator U2 is grounded through the capacitor C3 and connected to the output port of the comparator U2 through the resistor R11. The positive terminal of the comparator U2 is connected to the output port of the comparator U2 through the resistor R9. The output port of the comparator U2 is connected to the input port of the diode D1. The output port of the diode D1 is connected to the output port 7.

When the external device 200 is connected to the video device 100, the internal resistor $R_i$ is serially connected to the external resistor $R_o$. The video signal generated by the signal generating circuit 10 is transmitted to the external device 200 through the internal resistor $R_i$. The voltage difference between the two ends of the internal resistor $R_i$ is very small, almost approaching zero, for example, in a range of about 0.01V to about 0.05V. The detecting circuit 20 outputs a low voltage difference to the base of the transistor Q1. Thus, the transistor Q1 is switched to an off state or is maintained in the off state until a high voltage difference comes and the transistor M2 is also switched to an off state or maintained in the off state until a high voltage difference comes (see below). The controlling circuit 30 outputs a controlling signal of a high voltage level. The high voltage level is about 5V. The controlling signal of the high voltage level is transmitted to the CPU 11 to make the CPU 11 work normally. The transistor M1 will be switched to an on state or maintained in the on state until a low voltage level comes and the video buffer 12 is connected to the 5V power supply. Thus, both the CPU 11 and the video buffer 12 are in a normal working state. The transistor Q2 is switched to the off state or is maintained in the off state, thus the auxiliary detecting circuit 40 idles.

When the external device 200 is disconnected to the video device 100. The voltage difference between the two ends of the internal resistor $R_i$ is about in a range of about 1V to about 2V. The detecting circuit 20 outputs a voltage difference of a high voltage level. Thus, the transistor Q1 is switched to an on state or is maintained in the on state until a low voltage difference comes and the transistor M2 is also switched to an on state or is maintained in the on state until a low voltage difference comes. The controlling circuit 30 outputs a controlling signal of a low voltage level. The controlling signal of the low voltage level is transmitted to the CPU 11 to turn off the CPU 11. The transistor M1 will be switched to an off state or maintained in the off state until a high voltage level comes, thus the video buffer 12 is cut off with the 5V power supply. Thus, both the CPU 11 and the video buffer 12 are in a turned off state. The transistor Q2 is switched to an on state or is maintained in the on state, thus the comparator U2 generates an auxiliary signal and transmits the auxiliary signal to the internal resistor $R_i$. In the present embodiment the auxiliary signal is a zigzag plus signal. The auxiliary signal can keep the CPU 11 and the video buffer 12 turned off when the external device 200 is disconnected with the video device 100.

It is to be understood, however, that even though numerous characteristics and advantages of the disclosure have been set forth in the foregoing description, together with details of the structures and functions of the embodiment(s), the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A video device, comprising:
   a signal generating circuit configured for generating video signals;
   an internal resistor connected to the output port of the signal generating circuit and matching with an external resistor of an external device;
   a detecting circuit connected to two ends of the internal resistor through two input ports thereof, and configured for detecting voltages of the two ends of the internal resistor and outputting a voltage difference there between; the detecting circuit comprising a first comparator, the positive terminal of the first comparator being connected to a first end of the internal resistor through a first resistor, the negative terminal of the first comparator being connected to a second end of the internal resistor through a second resistor, the positive terminal of the first comparator being grounded through a third resistor, the negative terminal of the first comparator being connected to the output port of the first comparator through a fourth resistor;
   a controlling circuit connected to the output port of the detecting circuit, and configured for determining whether or not the external device is connected to the video device according to the voltage difference, and outputting a controlling signal to the signal generating circuit; the controlling circuit comprising an N-type triode and a first MOSFET; the output port of the first comparator being connected to the base of the N-type triode through a fifth resistor, the base of the N-type triode being grounded through a first capacitor, the emitter of the N-type triode being grounded, the collector of the N-type triode being connected to a power supply through a sixth resistor and connected to the gate of the first MOSFET, the source of the first MOSFET being grounded, the drain of the first MOSFET being connected to the output port of the controlling circuit; and
   an auxiliary detecting circuit connected to the output port of the controlling circuit, and configured for generating an auxiliary detecting signal transmitted to the internal resistor.

2. The video device of claim 1, wherein the voltages of the two ends of the internal resistor are generated by the video signal when the external device is connected to the video device.

3. The video device of claim 1, the voltages of the two ends of the internal resistor are generated by the auxiliary detecting signal when the external device is disconnected to the video device.

4. The video device of claim 1, wherein the signal generating circuit comprises a CPU, and a video buffer, the CPU is configured for decoding video and audio data, the video buffer is configured for receiving decoded video and audio data from the CPU.

5. The video device of claim 2, wherein the voltage difference of the two end of the internal resistor is about in a range of about 0.01V to about 0.05V when the external device is connected to the video device, the detecting circuit outputs a voltage difference of a low voltage level.

6. The video device of claim 3, wherein the voltage difference of the two end of the internal resistor is about in a range of about 1V to about 2V when the external device is disconnected to the video device, the detecting circuit outputs a voltage difference of a high voltage level.

7. The video device of claim 5, wherein the controlling circuit outputs a high voltage level signal and transmits the high voltage level signal to the signal generating circuit and the auxiliary detecting circuit.

8. The video device of claim 6, wherein the controlling circuit outputs a low voltage level signal and transmits the low voltage level signal to the signal generating circuit and the auxiliary detecting circuit.

9. The video device of claim 7, wherein the high voltage level signal controls the signal generating circuit to continuously output the video signals, and turn off the auxiliary detecting circuit.

10. The video device of claim 8, wherein the low voltage level signal controls the auxiliary detecting circuit to continuously output the auxiliary detecting signal, and turn off the signal generating circuit.

11. The video device of claim 1, wherein the internal resistor and the external resistor are both about 75 ohms.

12. The video device of claim 4, wherein the signal generating circuit further comprises two input ports connected to the output ports of the controlling circuit, an output port connected to the first end of the internal resistor, and a second MOSFET; the input port of the CPU is connected to a first input port of the signal generating circuit, the output port of the CPU is connected to the video buffer, the output port of the video buffer is connected to the output port of the signal generating circuit, the source of the second MOSFET is connected to the power supply, the drain of the second MOSFET is connected to the video buffer, and the gate of the second MOSFET is connected to a second input port of the signal generating circuit.

13. The video device of claim 12, wherein the auxiliary detecting circuit comprises an input port connected to the output port of the controlling circuit and an output port connected to the first end of the internal resistor, the auxiliary detecting circuit further comprises a P-type triode, a second comparator, and a diode; the base of the second P-type triode is connected to the output port of the controlling circuit through an eighth resistor, the emitter of the P-type triode is connected to the power supply, and the collector of the P-type triode is connected to the positive terminal of the second comparator, the positive terminal of the second comparator is connected to the output port of the second comparator through a ninth resistor, the positive terminal of the second comparator is grounded through a second capacitor and a tenth resistor, the negative terminal of the second comparator is grounded through the a third capacitor and connected to the output port of the second comparator through a eleventh resistor of the four resistors, the output port of the second comparator is connected to the positive terminal of the diode and the negative terminal of the diode is connected the first end of the internal resistor.

* * * * *